Dec. 9, 1969 R. E. SHATTUCK 3,482,671

BACK SPACE MECHANISM FOR TYPEWRITERS AND LIKE MACHINES

Original Filed Sept. 19, 1966 2 Sheets-Sheet 1

*INVENTOR.*
RICHARD E. SHATTUCK

*BY*

Strauch, Nolan, Neale, Nies & Bronaugh
ATTORNEYS

BACK SPACE MECHANISM FOR TYPEWRITERS AND LIKE MACHINES

Original Filed Sept. 19, 1966

*INVENTOR.*

RICHARD E. SHATTUCK

*BY*

Strauch, Nolan, Neale, Nies & Bronaugh

ATTORNEYS

United States Patent Office 3,482,671
Patented Dec. 9, 1969

3,482,671
BACK SPACE MECHANISM FOR TYPEWRITERS AND LIKE MACHINES

Richard E. Shattuck, Cortland, N.Y., assignor to SCM Corporation, a corporation of New York Continuation of application Ser. No. 580,524, Sept. 19, 1966. This application Jan. 3, 1968, Ser. No. 695,525
Int. Cl. B41j *19/62*
U.S. Cl. 197—91 3 Claims

ABSTRACT OF THE DISCLOSURE

A powered back space mechanism operable to back space a typewriter carriage at a gradual rate to reduce damage and wear to the parts involved. The mechanism includes a cam and cam follower to provide the gradual rate of motion and includes a key controlled spring clutch to couple the power source to the cam and cam follower.

This application is a continuation of my copending application Ser. No. 580,524, filed Sept. 19, 1966, now abandoned, and which in turn was a continuation-in-part of my copending application, Ser. No. 360,653 filed Apr. 17, 1964, for improvements in Back Space Mechanism for Typewriters and Like Machines, which is now abandoned.

This invention relates to power operated typewriters or like machines and more particularly to an improved powered back spacing mechanism.

The conventional powered back spacing mechanisms have a pawl assembly arranged to be engageable with a power drive toothed snatch roll. The disadvantage of this system is that the back space linkage is subjected to a sudden acceleration which causes excessive wear and damage to the parts. The sudden acceleration also places a strain on the motor by requiring a surge of additional torque to actuate the linkage. The conventional pawl and toothed snatch roll powered typewriters compensates for the required additional torque by either utilizing a higher torque motor than is needed for the remaining powered instrumentalities or by adding additional linkage.

Another conventional powered back spacing mechanism has a system of a cam assembly arranged to be engageable with a power driven rubber power roll. The disadvantage of this system is that numerous engagements of the cam against the rubber power roll causes the rubber to become slick and/or wear resulting in malfunctioning back space operations. The common repeat back space enhances the aforementioned malfunctionining due to continuous engagement of the cam against the power roll during the repeat operation.

Known powered back spacing mechanisms, such as a Patent 2,905,297 to Stuiber et al. dated Sept. 22, 1959, for Repeat Actuation Mechanism for Business Machines have a cam and cam follower construction for actuating the back space linkage at a desirable gradual rate. These mechanisms have a distinct disadvantage by having an additional shaft for supporting the cam and an additional power drive system to rotate the shaft for actuating the back space operation. The additional shaft and power drive system results in excessive costs, excessive weight, inherently increases the chances of mechanical failure and causes an excessive drain on the motor. The excessive drain on the motor is particularly undesirable for compact typewriters having minimum size and weight motors which provide relatively low torque for operating heavy load features such as shifting a typebar segment or back spacing the carriage.

It is an object of this invention to provide a powered back space mechanism utilizing a cam and cam follower concept that actuates the back space linkage at a desirable gradual rate thereby preventing excessive wear and damage to the parts and thereby eliminating the need for a higher torque motor.

Another object of this invention is to provide an efficient and economically constructed cam operated back space mechanism by mounting the cam on the conventional power roll shaft, which is already present in the machine for power actuating the printing action and other typewriter instrumentalities. This construction requires substantially fewer parts which reduces the cost and weight of the machine, requires less maintenance and reduces the power drain on the motor. This construction is particularly important when adapted to low cost and light weight portable electric typewriters.

Another object of this invention is to provide a powered back space mechanism that has a positive drive connection between the power source and the cam and cam follower. The positive drive connection, a spring clutch in this case, prevents the malfunctioning of the cam and rubber power roll system previously described.

A further object of this invention is to provide a powered back space mechanism with a repeat feature employing the spring clutch positive drive connection. The positive drive connection has particular advantages for a repeat feature in that in the pawl and toothed snatch roll system, excessive wear to the pawl and toothed snatch roll due to their complete disengagement and re-engagement for every back space operation is avoided. In comparison to the cam and rubber power roll system, excessive wear to the rubber power roll due to continuous engagement of the cam against the roll during the repeat operations is avoided.

These and other objects of this invention will become more fully apparent by reference to the appended claims and as the following detailed description proceeds in reference to the accompanying drawing wherein:

Figure 1:
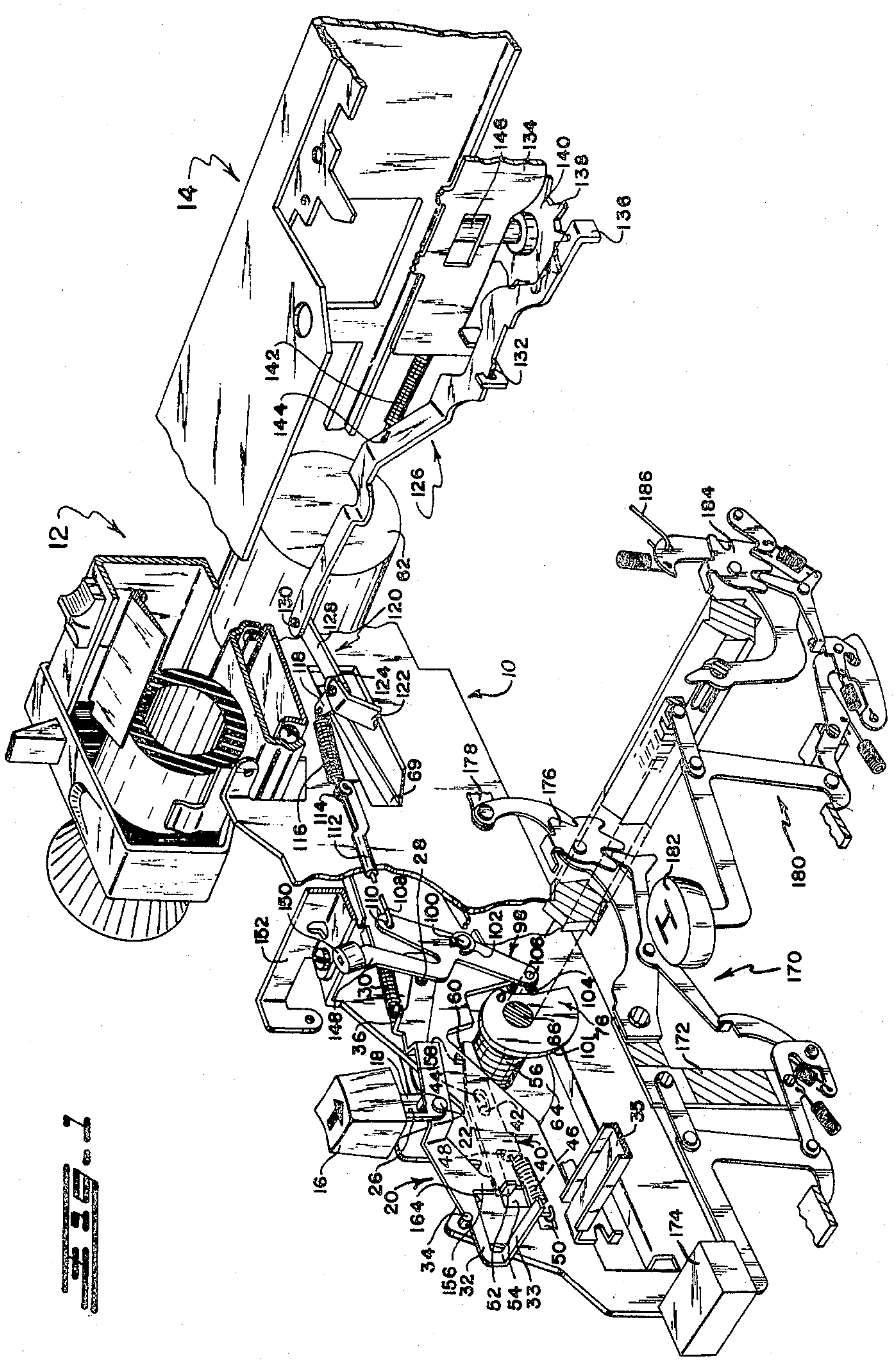
FIGURE 1 is a front perspective view of the powered back space mechanism of the present invention including the cam for actuating the back space linkage mounted on the power roll shaft, and of a case shift and a printing action mechanism operable by the power roll.

As shown in FIGURE 1, one of the advantages of the present invention is mounting the back space actuating cam on the same shaft that powers other typewriter instrumentalities such as the powered case shift mechanisms and the powered printing actions.

Referring now to the drawings in detail and particularly to FIGURE 1, the back space control mechanism is supported by the left side frame 10 and extends to the back of the typewriter below the carriage 12 and to the right toward the center of the back frame 14.

The back space key button 16 is rigidly mounted on a key stem 18 which is pivotally mounted on lever 20 by a rivet 22 and is guided in an upstanding position by an ear 24 formed from lever 20 extending through an aperture 26 in key stem 18. Lever 20 is pivotally mounted on the inside of side frame 10 by a shouldered screw 28 having the shoulder portion seated in the side frame and being in threaded engagement with lever 20. Lever 20 is biased clockwise by a spring 30 to its normal inoperative position which is determined by a forward end 32 abutting against a pin 34 that is rigidly assembled to side frame 10. Spring 30 is connected at one end to a tab 36 formed from lever 20 and at the other end to a spring anchor (not shown) formed from side frame 10.

Figures 2, 3:
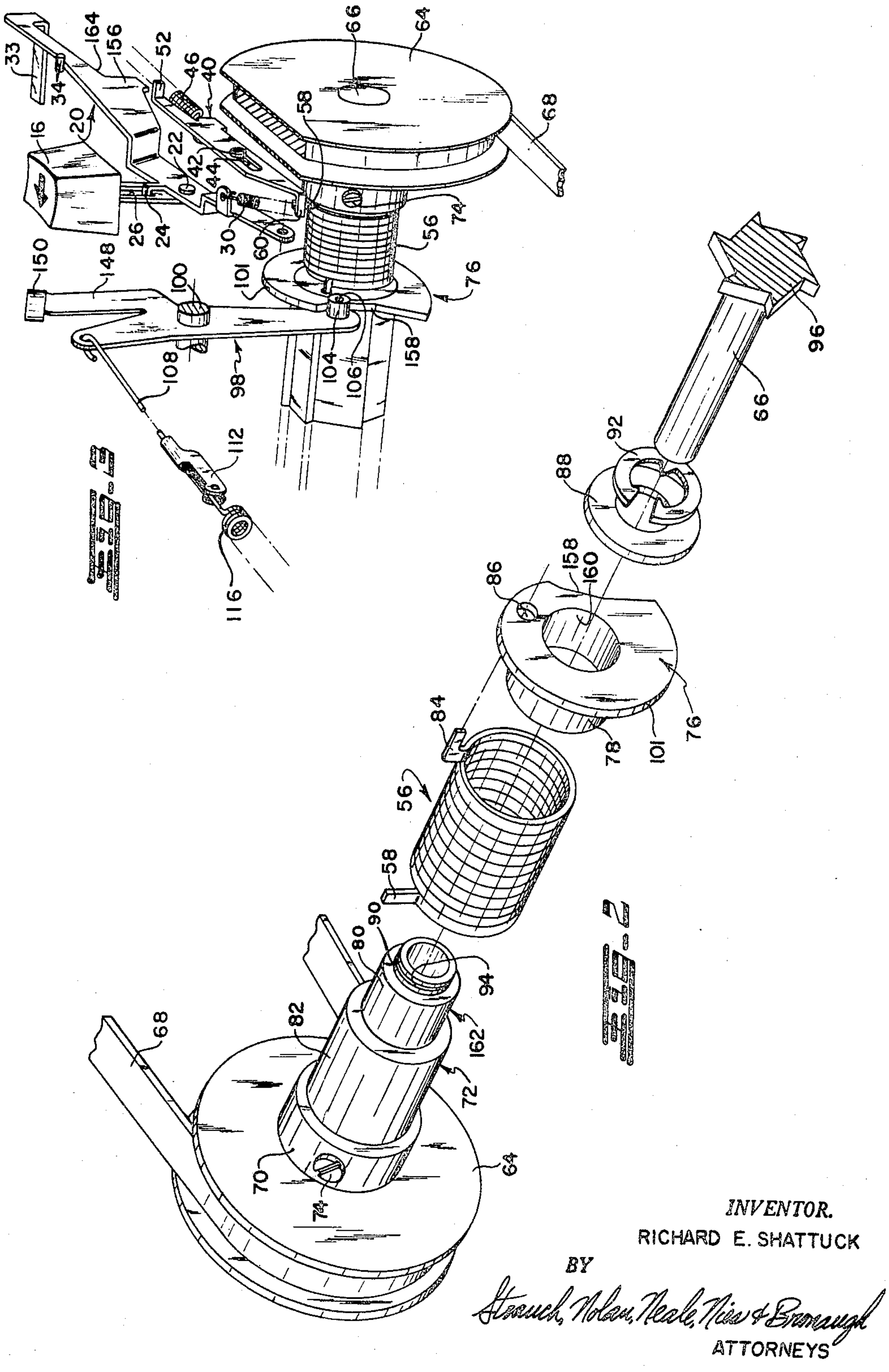
FIGURE 2 is an exploded pictorial view of the positive drive connection for the back space linkage.
FIGURE 3 is a rear perspective view of the power driving means and control thereof.

A latch 40 is slidably mounted on frame 10 on the outside of the frame by a shouldered screw 42 having the shoulder portion extending into elongated slot 44 and the threaded portion in threaded engagement with side frame 10. Latch 40 is biased to its normal inoperative position as shown in FIGURE 1 and FIGURE 3 by two springs. A tension spring 46 is connected at one end to a tab 48 formed from latch 40 and at the other end in an aperture 50 in side frame 10. Spring 46 biases latch 40 clockwise (FIGURE 1) about screw 42 to a limited position which is determined by a tab 52 formed from the most forward end of latch 40 and extending inward through an aperture 54 in side frame 10 that abuts against the upper edge of the aperture. The second spring is a spring clutch spring 56 which has a formed upstanding extension 58 that engages an ear 60 formed from the most rearward end of latch 40. Spring clutch 56 is wound such that extension 58 having greater tension than spring 46 biases latch 40 toward the rear of the machine until the forward end of slot 44 limits against screw 42.

The power source for actuating the present novel back spacing mechanism and other powered instrumentalities comprises a motor 62 located at the rear of the machine having a pulley mounted on a shaft extending therefrom (not shown); a pulley 64 rigidly assembled on the end of a shaft 66 located at a forward position in the machine; and a speed reduction belt drive train having two belts, belt 68 seen in FIGURES 2 and 3 and belt 69 a portion of which is shown in FIGURE 1, interconnecting pulley 64 to the motor shaft pulley. Belt drives of the type illustrated in FIGURES 2 and 3 and the manner in which they operate are well known (see for example U.S. Reissue Patent No. 25,024, dated Aug. 15, 1961).

Reference is now made to FIGURE 2. Pulley 64 has an integarl hub portion (not shown) extending into a step portion 70 of a sleeve 72 such that a set screw 74 passes through an opening in step portion 70 and is in threaded engagement with the hub portion extension of pulley 64. Screw 74 can be turned inward until it abuts against shaft 66 thereby rigidly assembling pulley 64 and sleeve 62 to shaft 66. A cam 76 has a hub portion 78 that is mounted for rotation on collar 80 which is an integral extension from sleeve 72. When cam 76 is mounted on collar 80 as shown by the assembled views, FIGURES 1 and 3, spring clutch 56 surrounds hub portion 78 of cam 76 and section 82 of sleeve 72. Spring clutch 56 has a longitudinal formed extension 84 that extends in aperture 86 in cam 76. A washer 88 is positioned on smaller diameter portion 90 of sleeve 72 and a keeper 92 is assembled in groove 94 thereby holding washer 88, cam 76 and spring clutch 56 as an assembled unit on sleeve 72. A toothed snatch roll 96 being integral with shaft 66 extends across the machine for power actuating other instrumentalities.

Referring back to FIGURE 1, a bellcrank 98 is pivotally mounted on a post 100 that is rigidly mounted on side frame 10 and is retained by a keeper 102. A roller 104 is pivotally assembled on a pin 106 which is rigidly assembled at the lower end of bellcrank 98. A wire link 109 is connected at its forward end in an aperture 110 at the upper end of bellcrank 98. The rearward end of wire link 108 is threaded for receiving a U-shaped adjustable connector 112 having a pin 114 interconnecting the free ends of the connector. A spring 116 is connected at one end to pin 114 and at the other end to one leg 118 of an L-shaped bellcrank 120. Adjustable connector 112 is adjusted on wire link 108 to remove the slack in the connections of link 108 and spring 116. Under this condition the tension of spring 116 is heavy enough to act as a link under normal operating conditions. Bellcrank 120 is pivotally mounted on a bracket 122 by a shouldered screw 124 which is in threaded engagement with bracket 122. Bracket 122 is rigidly mounted to side frame 10 by conventional means.

A back space pawl 126 is pivotally assembled at one end to the second leg 128 of an L-shaped bellcrank 120 by a shouldered rivet 130 and is guided near the opposite end by an elongated slot 132 formed in a bracket 134 that is rigidly mounted to back frame 14 by conventional means. Pawl 126 has a downward formed tab 136 at the free end for engaging the teeth 138 of an escapement star wheel 140. A spring 142 is connected at one end to pawl 126 in aperture 144 which is located substantially midway of its end and is connected at the other end to bracket 134. Star wheel 140 is rigidly mounted at the lower end of a shaft 146. A conventional pinion gear (not shown) is rigidly assembled at the upper end of shaft 146 and is in engagement with a toothed rack (not shown) which is rigidly assembled to carriage 12. The normal inoperative position of pawl 126 is determined by spring 142 biasing the pawl toward the right which, in turn, biases bellcrank 120 clockwise about pin 124. Bellcrank 120 pulls spring 116, connector 112 and link 108 toward the rear of the machine which pivots bellcrank 98 clockwise about post 100. Bellcrank 98 has an upward extending arm 148 with a rubber abutment 150 assembled at the upper end that limits against the edge of a bracket 152 thereby limiting the clockwise movement of bellcrank 98 which determines the rest position of the remaining linkage.

The linkage including bellcrank 98, wire link 108, adjustable connector 112, spring 116, L-shaped bellcrank 120 and back space pawl 126 is hereinafter referred to as the back space linkage.

The functional operation of the improved powered back space mechanism will now be described with reference to FIGURE 1. When motor 62 is energized, pulley 64 continually rotates clockwise which rotates shaft 66 and integral power roll 96 in a clockwise direction while spring clutch 56 and cam 76 normally remain idle. The depression of key button 16 pivots lever 20 counterclockwise about screw 28 against the tension of spring 30 to a normally limited position determined by rightward extending arm 33 abutting against a bail 35. Lever 20 has an abutment 156 that contacts tab 52 of latch 40 and pivots the latch counterclockwise about screw 42 which raises ear 60 of latch 40 releasing extension 58 of spring clutch 56. By releasing extension 58, the spring tends to contract to its normal laxed condition thereby gripping the peripheral surface on section 82 of sleeve 72 shown in FIGURE 2. The gripping force of the spring clutch on section 82 of sleeve 72 is transferred throughout the coils of the spring thereby also gripping the peripheral surface on hub portion 78 of cam 76. Thus the spring clutch 56 provides a positive connection between sleeve 72, which can be referred to as the driving member, and cam 76, which can be referred to as the driven member.

The rate of rotation of pulley 64 now transfers the same rate of rotation to cam 76. Cam 76 rotates in a clockwise direction about the axis of shaft 66 causing the cam follower (roller 104) to pivot bellcrank 98 counterclockwise about post 100. Even though cam 76 is rotating at the same rate as pulley 64, bellcrank 98 is pivoted at a gradual increasing rate due to the increasing radius of the camming surface 101. It is the main object of the present invention to actuate bellcrank 98 at a gradual increasing rate to prevent sudden acceleration to the back space linkage thereby preventing excessive wear and damage to the parts.

The counter-clockwise pivoting motion of bellcrank 98 pulls link 108, connector 112 and spring 116 toward the front of the machine which, in turn, pivots bellcrank 120 counter-clockwise about pin 124. Bellcrank 120 drives back space pawl 126 toward the left which causes tab 136 to engage a tooth 138 of star wheel 140 and to rotate the star wheel clockwise about shaft 146 thereby back spacing the carriage 12 one letter space.

As cam 76 continues to rotate, the high portion of the cam surface travels past the cam follower 104 allowing the cam follower to be biased into the low radius cut out portion 158 of cam 76. The bellcrank 98 is rotated clockwise and the remaining back space linkage is returned to its normal inoperative position by the biasing force of spring 142.

When the carriage 12 is positioned at the extreme left margin and the key button 16 is depressed, cam 76 will pivot bellcrank 98 which will attempt to actuate the back space linkage. Tab 136 of pawl 126 will contact a tooth on the star wheel and then will be blocked from further travel since the carriage cannot be spaced. Under this condition spring 116 will yield to allow cam 76 to completely rotate under power without damage to any part of the back space mechanism.

Cam 76 is permitted to rotate only a single cycle when key button 16 is depressed, whether the button is held depressed or is depressed and immediately released. When abutment 156 pivots latch 40 counter-clockwise about screw 42, spring 46 pulls latch 40 toward the front of the machine along slot 44 such that tab 52 of latch 40 is positioned in front of and beyond abutment 156 of lever 20 thereby allowing spring 46 to pivot latch 40 clockwise about screw 42. Ear 60 of latch 40 is now returned to a position in the path of extension 58 of spring clutch 56 such that as spring clutch 56 rotates clockwise extension 58 will contact ear 60. Due to the slight drag of the inside surface 160 of cam 76 rotating on the outside surface 162 of collar 80, shown in FIGURE 2, cam 76 and spring clutch 56 tend to rotate clockwise with the rotation of sleeve 72. This tendency of clutch spring 56 to rotate clockwise being blocked by ear 60 against extension 58 causes spring clutch 56 to expand radially thereby releasing spring clutch 56 and cam 76 from the driving connection of sleeve 72. Spring clutch 56 and cam 76 now remain idle while pulley 64, sleeve 72 and toothed snatch roll 96 continue to rotate.

The improved repeat back space actuation will now be described. When key button 16 is held depressed for a single back space action, latch 40 is biased by spring 46 toward the front of the machine until screw 42 is positioned at the most rearward end of slot 44 and tab 52 of latch 40 is positioned in front of abutment 156 as previously described. Repeat actuation is accomplished by further depression of key button 16 which is permissible by arm 33 pivoting bail 35 downward. Lever 20 is further pivoted counter-clockwise about screw 28 causing a lower edge 164 of lever 20 to contact tab 52 of latch 40 and again pivot latch 40 counter-clockwise about screw 42 which again raises ear 60 of latch 40 out of the path of extension 58 of spring clutch 56. Spring clutch 56 again tightens on sleeve 72 for positively drive connecting cam 76 to drive shaft 66 and cam 76 is rotated clockwise for actuating the back space linkage. In this condition, however, as long as key button 16 is held in the repeat depressed position, the spring clutch 56 continually rotates cam 56 for repeat back space actuation. This continuous positive connection of sleeve 72 and cam 76 has a distinct advantage over the prior art for repeat actuations in that there is no complete disengagement and re-engagement of the power source and the back space linkage for every back space actuation as disclosed by the prior art. This repeated disengagement and re-engagement causes undesirable excessive wear to the parts.

The repeat back space actuation is terminated by releasing key button 16 which allows spring 30 to pivot lever 20 clockwise to its normal inoperative position. Spring 46 pivots latch 40 clockwise until tab 52 abuts against the upper edge of aperture 54 and extension 58 of spring clutch 56 again contacts ear 60 of latch 40 which drives latch 40 rearward to its normal inoperative position as shown in FIGURES 1 and 3.

The case shift mechanism 170 is supported by a rigid bracket 172 and is operable by depressing shift key 174 which pivots a pawl 176 into engagement with the toothed snatch roll 96 for pulling a link 178 downward. Link 178 is only partially shown to illustrate that it can be connected to any conventional power actuated case shifting linkage. The printing action 180 is operable by depressing key 182 which pivots a pawl 184 into engagement with the toothed snatch roll 96 for pulling a link 186 downward. Link 186 is only partially shown to illustrate that it can be connected to any conventional printing typebar linkage.

The distinct advantage of the present invention over the prior art can now be seen by having the back space cam 76 mounted on the end 66 of the toothed snatch roll shaft 96 which takes advantage of a shaft and power drive system that is already present in the machine for operating other typewriter instrumentalities. This eliminates the need of finding other available space in the normally crowded typewriter side frames and substantially reduces weight and cost of the machine.

What is claimed and desired to be secured by Letters Patent is:

1. A power operated typewriter comprising:

(a) a frame;

(b) a keylever means on said frame selectively pivotable to a first position and a second position from a rest position, said keylever means having (1) a first engagement surface and (2) a second engagement surface thereon;

(c) a latch means having (1) a third engagement surface and (2) an ear thereon, said latch means being mounted on said frame for sliding and pivotable movement relative to said keylever means by a pin and slot connection with said frame;

(d) spring means for pivoting and sliding said latch means to one position;

(e) a continuously rotatable power roll;

(f) a driven cam member;

(g) a driving member fixedly attached to said power roll;

(h) a spring clutch for connecting said driven cam member to said driving member and (1) having an extension engageable with said ear of said latch means whereby said spring clutch is disengaged;

(i) cam follower meanes operably engageable with said cam member;

(j) a back space linkage means connected to said cam follower means;

(k) and yieldable means engageable with said keylever means;

(l) whereby depression of said key lever means to said first position pivots said latch means against the bias of said spring means through engagement of said first and third engagement surfaces, thereby releasing said spring clutch for engagement to operate said back space linkage for one back space operation, said spring means effecting disengagement of said first and third engagement surfaces and pivoting said latch means including said ear into said one position to engage said extension after substantially one revolution thereof;

(m) and whereby further depression of said keylever means to said second position against the bias of said yieldable means further pivots said latch means including said ear against the bias of said spring means through engagement of said second and third engagement surfaces, thereby to move said ear out of the path of said extension to effect repeat spacing by said back space linkage.

2. A backspace mechanism for a typewriter having a carriage, power-operated instrumentalities, and a continuously rotating power roll for driving said mechanism and instrumentalities, which mechanism comprises:

(a) a backspace linkage operably connected to said carriage and effective upon actuation to move the carriage one space in the backspace direction for each cycle of the linkage, said backspace linkage having a cam follower thereon;

(b) a rotatably mounted cam means for actuating said cam follower on said backspace linkage upon rotation of said cam means thereby actuating said backspace linkage;

(c) a clutch having a driving member rotatably driven by said power roll and a driven member connected to said cam means;

(d) control means for selectively actuating said clutch from its normally unactuated condition to a first actuated condition for a single cycle of the linkage and to a second actuated condition for repetitive cycling of the linkage;

(e) a single keylever depressible by a used from a rest position to a single-cycle position and thereafter to a repeat-cycle position for operating said control means to activate said clutch to corresponding conditions whereby, (1) said keylever being in rest position, said control means renders the clutch unactuated, (2) said keylever being in single-cycle position, said control means engages said clutch to operate said backspace linkage through one cycle corresponding to each revolution of the power roll and to then disengage said clutch even if said keylever remains in this single-cycle position, and (3) said keylever being in repeat position, said control means continuously engages said clutch to repetitively cycle said backspace mechanism until said keylever is returned to either of the other two positions; and (f) restraining means in the path of movement of said keylever for engaging said keylever at its single cycle position yieldably restraining it there and for yielding to further depression of said keylever by the user to its repeat cycle position.

3. A backspace mechanism as defined in claim 2 wherein (a) the clutch driving member is a drum, (b) the clutch driven member is a coiled spring being disposed around the drum and having a normal condition and an expanded condition, (1) the spring in its normal condition tending to contract around the drum for gripping engagement and rotation therewith, (2) the spring in its expanded condition being partially uncoiled and freely rotatable on said drum, (c) the control means is a latch engageable with the spring, (1) the latch (when the keylever is in rest position) maintaining the spring in its expanded condition whereby the cam and linkage remain unactuated, (2) the latch (when the keylever is in single-cycle position) being temporarily disengaged from the spring, releasing the spring first to reach its normal condition and gripping engagement with the drum, then to be rotated through one revolution, and finally at the end of the revolution to be reengaged by the latch to its expanded condition and thereby disengaged from the drum, (3) the latch (when the keylever is in repeat-cycle position) being disengaged from the spring, releasing it to grip and rotate continuously with the drum until the keylever is returned to either of the former two positions.

References Cited

UNITED STATES PATENTS

| | | | |
|---|---|---|---|
| 1,614,474 | 1/1927 | Hokanson | 197—91 |
| 1,913,892 | 6/1933 | Mez. | |
| 1,984,410 | 12/1934 | Hart | 197—91 |
| 2,254,764 | 9/1941 | Yaeger | 197—17 |
| 2,728,437 | 12/1955 | Kupper | 197—91 |
| 2,798,584 | 6/1957 | Kennedy | 197—17 |
| 2,872,015 | 2/1959 | Toggenburger | 197—91 |
| 2,905,297 | 9/1959 | Stuiber et al. | 197—91 X |
| 2,930,470 | 3/1960 | Roller et al. | 197—151 |
| 2,973,078 | 2/1961 | Templeton et al. | 197—17 |
| 3,157,265 | 11/1964 | Palmer | 197—16 |
| 3,181,680 | 5/1965 | Cappotto et al. | 197—17 |
| 3,212,616 | 10/1965 | Frechette et al. | 197—82 |
| 3,217,850 | 11/1965 | Frechette et al. | 197—82 |
| 3,268,049 | 8/1966 | Krauss et al. | 197—91 X |

ERNEST T. WRIGHT, JR., Primary Examiner